United States Patent [19]

Nagler et al.

[11] Patent Number: 5,146,453
[45] Date of Patent: Sep. 8, 1992

[54] CIRCUIT CONFIGURATION FOR CLOCK-CONTROLLED TIME DIVISION MULTIPLEX TELECOMMUNICATIONS SWITCHING INSTALLATIONS

[75] Inventors: Werner Nagler, Hohenschaeftlarn; Fritz Hlawa, Deisenhofen; Lothar Schmidt, Fuerstenfeldbruck, all of Fed. Rep. of Germany

[73] Assignee: Siemens Aktiengesellschaft, Berlin and Munich, Fed. Rep. of Germany

[21] Appl. No.: 410,688

[22] Filed: Sep. 21, 1989

[30] Foreign Application Priority Data

Sep. 22, 1988 [DE] Fed. Rep. of Germany ....... 3832242
Sep. 23, 1988 [DE] Fed. Rep. of Germany ....... 3832425
Sep. 29, 1988 [DE] Fed. Rep. of Germany ....... 3833074
Sep. 29, 1988 [DE] Fed. Rep. of Germany ....... 3833078

[51] Int. Cl.[5] .......................... H04J 1/16; H04J 3/14; H04Q 11/04
[52] U.S. Cl. ..................................... 370/16; 370/58.1
[58] Field of Search ................. 320/13, 16, 58.1, 58.2, 320/58.3, 60, 60.1, 94.1, 94.2, 94.3; 371/11.2, 8.1, 8.2

[56] References Cited

U.S. PATENT DOCUMENTS

| | | | |
|---|---|---|---|
| 4,488,292 | 12/1984 | Troost | 370/63 |
| 4,670,871 | 6/1987 | Vaidya | 370/94.1 |
| 4,905,220 | 2/1990 | Junge et al. | 370/16 |
| 4,905,222 | 2/1990 | Seeger et al. | 370/16 |
| 4,914,429 | 4/1990 | Upp | 370/58.1 |
| 5,010,550 | 4/1991 | Hirata | 370/16 |

FOREIGN PATENT DOCUMENTS 3106903 9/1982 Fed. Rep. of Germany.
3111022 10/1982 Fed. Rep. of Germany.
3227849 1/1984 Fed. Rep. of Germany.
835406 3/1984 South Africa.

OTHER PUBLICATIONS

"telcom report", supplement to the fourth volume (1981).

Primary Examiner—Douglas W. Olms
Assistant Examiner—Wellington Chin
Attorney, Agent, or Firm—Adel A. Ahmed

[57] ABSTRACT

In a circuit configuration for clock-controlled time division multiplex telecommunications switching installations, including PCM telephone switching installations with central switching network and connected subswitching networks, line groups are connected to a central switching network via time division multiplex lines and have one subswitching network and one group control unit each are pairwise assigned to each other. Line units which are individually assigned to the one or the other of two line groups are, in normal operation, connected to the subswitching network of their own line group and can be changed over to the subswitching network of the particular other line group in standby operation. In the line units, equalizing memorys are provided in duplicate and, specifically, in each instance for the message stream to and from line group-common subswitching network, on the one hand, and for the message stream to and from the subswitching network of the particular partner line group. The equalizing memories receive the pulse clock for their clock-controlled output processes in each instance from that subswitching network to which they output their messages. First equalizing memories receive their pulse clock from their own line group; second equalizing memories receive their pulse clock from the particular partner line group.

5 Claims, 1 Drawing Sheet

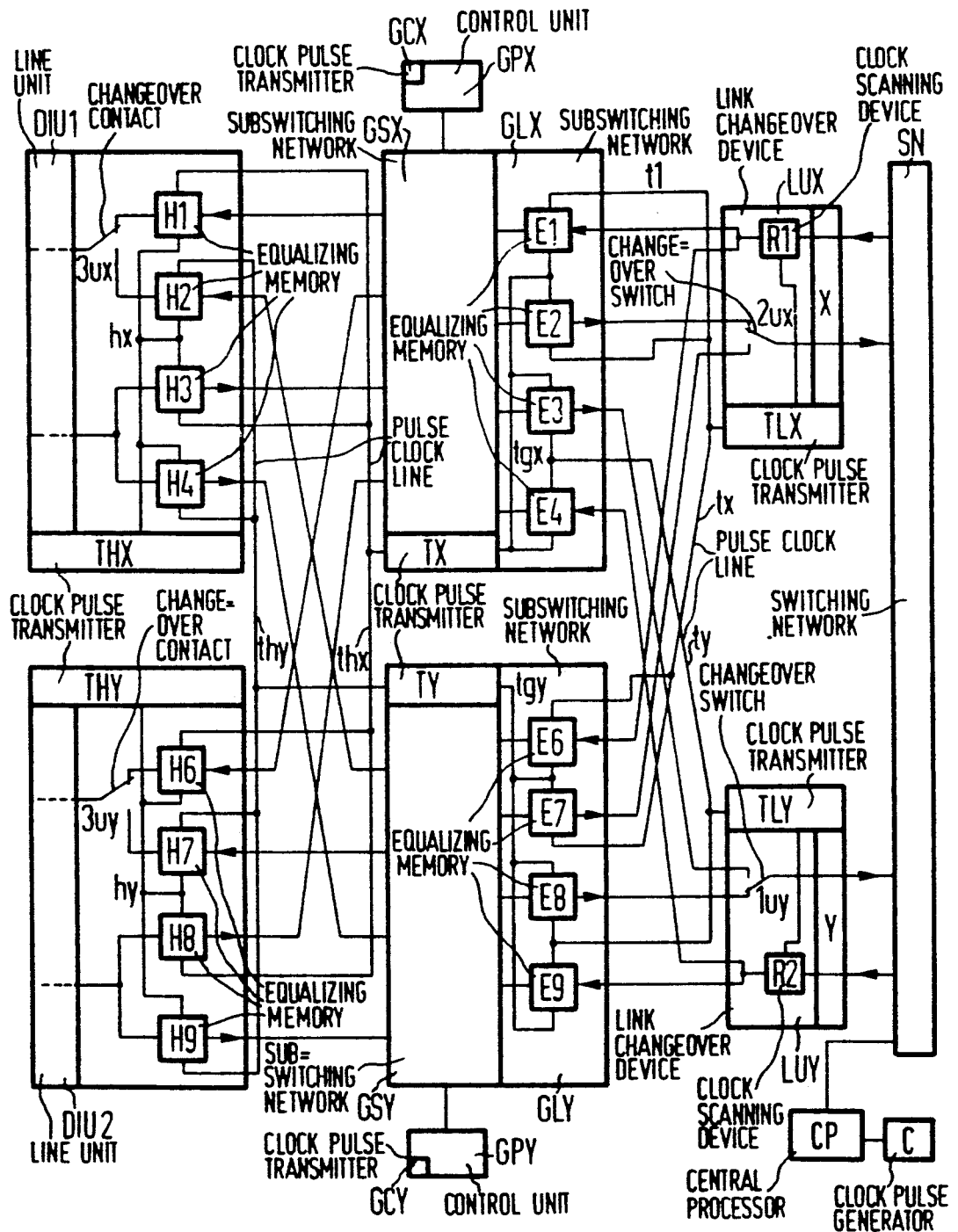

CIRCUIT CONFIGURATION FOR CLOCK-CONTROLLED TIME DIVISION MULTIPLEX TELECOMMUNICATIONS SWITCHING INSTALLATIONS

The present invention relates to a circuit configuration for clock-controlled telephone switching systems, and more particularly PCM telephone switching systems having a hierarchical structure with central switching network, a central processor, with subswitching networks coupled thereto via line connections, for connecting subscriber lines and/or interexchange trunks or channels and with intermediate level control units assigned thereto, and with a clock supply system wherein from a central clock pulse generator assigned to the processor for clocking its clock-controlled functions assigned individually to the control units, functioning to regenerate the clock pulses and governing the clock pulse-controlled completion of functions in each of the control units, clock pulse transmitters receive their master clock signal in that they derive the latter in each instance from the pulse-clock-controlled transmitted message stream of the connection via the switching network and via the subswitching networks and regenerate it, and with a pair-wise assignment of the subswitching networks where, in normal operation, two connection paths leading separately via the one or the other upon change-over switching to standby can be switched over from one of the two subswitching networks to the particular partner subswitching network by way of which, in that case, all connection paths lead.

A circuit configuration of this type is disclosed in German Patent Application 3 622 369 (VPA 86 P 1394). In this known case line units are provided for each subswitching network which function to connect subscriber lines and interexchange trunks. These may be appropriate channels or channel systems. These line units which function to connect these lines in normal operation are connected via appropriate connection paths with the subconnection path to the subswitching network to which they are assigned. Connection paths are provided which lead from the connection devices of a line trunk to the subswitching network of the same line group as well as connecting paths which lead from these line units to the subswitching networks of the particular partner line group. It is furthermore provided in this known case upon transition from normal operation to stand-by operation, to change the connection devices of one line group—and hence also the subscriber lines and interexchange trunks connected to it—from the assigned subswitching network, and thus from the subswitching network of the same line group over to the subswitching network of the particular partner line group. It thereby becomes possible upon failure of the subswitching network of one line group or its group control unit to continue to operate the subscriber lines and interexchange trunk connected to their subswitching network via the particular line unit in that the required connections in changeover switching operation are established via the subswitching network of the particular partner line group.

In circuit configurations of the known type, the clock supply is hierarchically structured. From the cited central processor, data and control connections exist to the group control unit of each line group. These should not be confused with data connections which are dialed and established by the subscribers. Rather, these are connections for data exchange between the group control units on the one hand and the central processor on the other. These connections function essentially also for controlling the group control units through the central processor. These connections are established in the manner known from unexamined German Patent Application 3 106 903 (VPA 81 P 6209) via the central switching network and extend via it to all line groups. By way of these connections the central processor is in constant data exchange with the group control units. These connections function inter alia also for the purpose of transporting a master clock occurring in a central clock generator of the central processor to the group control units of the line groups. Regarding this, reference is made to German Patent Application 31 11 022 (VPA 81 P 6224). Pulse clock transmitters at different sites take the clock from the current data stream, become synchronized to it, and regenerate the clock pulses. Apart from the individual clock pulses, this also includes a pulse frame identification bit marking the beginning of a pulse frame. Thus the clock pulses are regenerated in connection with the entire pulse frame structure.

In the course of transmission of the master clock pulses from the central clock generator of the central processor to the group control units, transit time differences and transit time fluctuations tend to occur. This is due to the different lengths of the connecting paths through-connected in each instance via the switching network, as well as the different line lengths between the switching network and the different line groups, and the manufacturing tolerances and additional influences of this type.

In known configurations, the problem of transit time differences and fluctuations exists in connection with the indicated changeover processes. If subscriber lines and/or interexchange trunks which initially are connected with a subswitching network are changed over to the particular partner subswitching network, then phase differences with respect to the pulse clock can become noticeable which determine clock-controlled switching processes in the one subswitching network and in the other subswitching network in each instance. Regarding the clock pulse, differences may exist between subswitching network and partner subswitching network as well as in view of the phase difference of pulse slopes corresponding to each other as well as also in view of the above cited pulse frame. If changeover processes are then carried out without taking these problems into account, then disturbances in the corresponding connections result. Pulse frames can be become mutilated or whole pulse frames may be lost. Likewise, upon the occurrence of phase jumps brought about by changeover processes, a continuously renewed synchronization of corresponding pulse clock transmitters may be required and thereby a disturbing discontinuity may be introduced into the entire clock system.

An aspect of the invention is based on the task of taking suitable precautions in a circuit configuration of the initially cited type by the aid of which the above described changeover processes can be completed without disturbances with respect to the entire clock control.

In accordance with one aspect, the invention solves this problem in that subscriber lines and/or interexchange trunks or channels, assigned in each instance to a subswitching network and connectable thereby to line connections connected thereto, are each equipped in duplicate with equalizing memories or storages which are clock-controlled and function for the time-delayed further transmission of the messages transmitted via the individually established connections, in that for each subswitching network, first equalizing memories are connected thereto and second equalizing memories are connected to the particular partner subswitching network, in that the acquisition and write processes of the different equalizing memories which are included in the message flow on the one hand in a first transmission direction from the particular subswitching network to the subscriber lines and/or interexchange trunks or channels are controlled by a pulse clock governing the particular subswitching network, more particularly by a clock pulse transmitter assigned thereto, and on the other hand, are included in the message flow in a second transmission direction, are controlled by a pulse clock which governs a line connecting device of subscriber lines and/or interexchange trunks or channels connected to the same subswitching network, more particularly by a clock pulse transmitter assigned to this line unit, and that the read and further routing processes of the first and second equalizing memories, on the one hand, are controlled differently with respect to the message flow in the first transmission direction by the last cited pulse clock and, on the other hand, with respect to the message flow in the second, that is, the reverse transmission direction, are controlled differently, and more specifically in such a manner that, in the process, the particular first equalizing memory is controlled by the pulse clock governing the particular appurtenant subswitching network, more particularly by the clock pulse transmitter assigned thereto, and the particular second equalizing memory by the pulse clock governing the particular subswitching network, more particularly by the clock pulse transmitter assigned thereto.

Thus, in general terms, the problem of changeover switching in connection with transition from normal operation to standby switching operation exists in prior art configurations. Furthermore, in the known configurations, an additional problem exists in that, upon a changeover of the subscriber lines and interexchange trunks connected to a subswitching network via the particular line units, individually occupiable connecting paths are subjected to an approximately twofold traffic load which extends between the subswitching network of a line group and the central switching network. In contrast, during a changeover, those connecting paths remain unused which extend between the corresponding subswitching network and the central switching network, that is, the connecting paths extending from the central switching network to that subswitching network which in the course of changeover to standby has been taken out of operation, in that the particular subscriber lines and interexchange trunks connected to this subswitching network via the particular line units in changing over in the course of switching over to standby were switched over to the subswitching network of the particular partner line group.

A simultaneous task of the invention is therefore to bring the traffic load between the particular subswitching network and the central switching network to a level which can be well realized practically in connection with a changeover switching in a circuit configuration of the initially cited type and in the process to avoid any disturbances with respect to clock-controlled message transmission.

The invention solves this task in that by means of a changeover device provided for each subswitching network and link connection, these can be switched over from the assigned subswitching network to the particular partner subswitching network, that the subswitching networks for connecting the link connections are equipped in duplicate with clock-controlled equalizing memories functioning for the reception and time-delayed further routing of the messages transmitted via the individually established connection, in which for each subswitching network the first of these equalizing memories are connected in normal operation with the line connection assigned to the same subswitching network via its changeover device and second equalizing memories in standby switching operation are connectable to the link connection assigned to the particular partner subswitching network, that the acquisition and write processes of the different equalizing memories, which are in the message flow, on the one hand, in the transmission direction from the particular subswitching network to the link connections, are controlled by the pulse clock governing the same, more particularly by a clock pulse transmitter assigned to this subswitching network and, on the other hand, in the message flow of the reverse transmission direction, separately by two different pulse clocks, in that a first equalizing memory is controlled by a pulse clock governing the changeover device of the particular subswitching network, in particular by a clock pulse transmitter assigned thereto, and a second equalizing memory by a pulse clock governing the changeover device of the particular partner subswitching network, in particular by a clock pulse transmitter assigned thereto, and that the read and routing processes of the first and second equalizing memory in a subswitching network, on the one hand, with respect to the message flow in the last-cited transmission direction, are controlled differently by a pulse clock appurtenant to the particular subswitching network, more particularly by a clock pulse transmitter assigned thereto from the first cited transmission direction, and specifically such that in the process the particular first equalizing memory is controlled by a pulse clock governing the changeover device corresponding to the particular subswitching network, in particular by a clock pulse transmitter assigned thereto, and the second equalizing memory by a pulse clock governing the changeover device corresponding to the particular partner subswitching network, more particularly by a clock pulse transmitter assigned thereto.

In the drawing, an exemplary embodiment of the invention is represented only in terms of its component parts contributing significantly to their comprehension, to which it is, however, by no means limited.

In the journal "telcom report", supplement to the fourth volume (1981), the EWSD digital switching system is described. Based thereon, the German Patent Application (unexamined) 3 622 369 (VPA 86 P 1394) describes further details which relate to the line groups already described in the cited supplement. Further details are shown in the drawing. The four line units for each line group represented in FIG. 2 of the cited Patent Application are reproduced in the drawing as a single line unit DIU1 or DIU2. One subswitching network for each line group is denoted by "GSX" and "GSY" in accordance with the reference chosen in the cited German Patent Application. These short-form references are chosen following the representation in illustration 1 on page 21 of the cited supplement. The central switching network SN in the drawing corresponds to the central switching network K1 in FIG. 1 of the here cited Patent Application herein cited and to the switching network in illustration 1 on page 21 of the cited supplement which in illustration 4 on page 23 of this supplement is denoted by "SN".

In the drawing, component parts of two line groups are represented, and specifically in a first line group a connection device DIU1, a subswitching network GSX and a line changeover device LUX. There are line units, denoted by "line units" in the cited supplement, for digital transmission systems as well as such for analog lines. These line units are referred to generally in the drawing a "DIU". Hence, the line units DIU1, the subswitching network GSX with an intermediate level control unit GPX and the already cited link changeover device LUX belong to a first line group. Analogously, the same applies for a second line group to which belong the line units DIU2, the subswitching network GSY with the intermediate level control unit GPY and the link changeover device LUY. In addition, a central processor CP is still provided which in the cited supplement, for example in illustration 1 and illustration 2 on pages 8 and 9, is denoted in this way. Such a processor is also shown and described in the cited Patent Application, and specifically duplicated, and is here denoted by "ZW2".

As has already been described in the cited literature the central processor builds connections via the central switching network data and specifically one each to each of the intermediate level control units of each of the line groups. These data connections should not be confused with individual data connections which are dialed by the subscribers. The data connections established by the central processor function to bring in information from the line groups and for the delivery of control data by the central processor to the intermediate level control units. The intermediate level control units use these control data for controlling the subswitching networks of the line units and so forth.

The cited patent application discloses that the line groups are assigned pair-wise to each other, and that the line units which belong to a line group and which in the normal operating state are connected to the subswitching network of the particular line group can be changed over in the emergency operating state to the subswitching network of the particular partner line group. To this end, in both Figures of the cited patent application, changeover switches are shown which are labeled here with "1d1" to "2d4". Changeover switches corresponding to them are denoted by "3ux" and "3uy" in the drawing.

The exemplary embodiment shown in the drawing is a clock-controlled time division multiplex communication switching system which is built preferably as a PCM telecommunication switching system. It is hierarchically structured with a central switching network SN, a central processor CP, and line groups connected to the switching network which each also include a subswitching network, an intermediate-level control unit, and line units. The connecting paths between the central switching network and each of the line groups are herein referred to as "link connections". They lead from the particular link changeover device, for example LUX, of the particular line to the central switching network SN. These link connections are multichannel time division multiplex lines. Each channel pair functions in a manner known per se to be occupied in connection establishment so that the desired connection can be established via that channel pair. That channel pair contains one channel each in the one transmission direction and one channel each in the other transmission direction in a manner known per se.

As was already explained, subscriber lines and interexchange trunk lines are connected to the subswitching networks of the line groups. The subscriber lines as well as the interexchange trunk lines can be implemented in analog technique as well as in digital technique.

According to the hierarchical structure, the central processor CP is in connection with each line group via the cited data connections. Via these, a continuous data exchange exists between the central processor and each of the intermediate-level control units in each of the line groups. This continuous data exchange can temporarily also be limited to the transmission of an idle state signal and, specifically, in each of the two transmission directions. In turn, a plurality of line units is connected to the subswitching network of a line group. Capacitors and the like can be connected to the line units. According to this hierarchical structure is a corresponding clock supply system in which, the clock pulse transmitters assigned individually to the intermediate-level control units receive their master clock from a central clock pulse generator C assigned to the central processor governing in known manner its clock-controlled progression of functions. This takes place in a manner known per se with the aid of the continuous data exchange between central processor and each of the intermediate-level control units already mentioned, in that the particular data stream for each line group is in each instance also supplied to the particular clock pulse transmitters which pick up the clock pulse regardless of their informational content and regenerate from it the general pulse clock. This pulse clock is governing in known manner in each of the intermediate-level control units for the progression of functions to be completed therein. In the case of the present exemplary embodiment such a clock pulse transmitter GCX or GCY is assigned to each of the intermediate-level control units. Still further clock pulse transmitters are assigned to the intermediate-level control units, in addition, and specifically TLX in the line changeover device LUX, TX in the subswitching network GSX and THX in the line units DIU1. Correspondingly, the same applies analogously to the second line group.

The cited clock pulse transmitters derive the master clock from the transmitted pulse clock controlled message stream in a manner known per se. As has already been explained, this message stream is conducted via the switching network SN and via the connections extending by way of the subswitching networks.

The clock pulse transmitters participate in this message stream and derive from it the master clock and regenerate it in known manner. Since the entire clock system is, in likewise known manner, organized into pulse frames with corresponding pulse frame identification bits which mark the beginning of in each instance one pulse frame, not only the individual clock pulses are derived and regenerated but also the regularly recurring pulse frame identification bits.

As has been explained, the line groups with their subswitching networks are already assigned pair-wise to each other. In normal operation, the through-connectable connection paths individual to a connection lead separately via the one or the other of the two subswitching networks. This means that the connection paths which extend via the line units DIU1 during normal operation all continue to run via the subswitching network GSX and then further via the link changeover device LUX to the central switching network SN. Correspondingly, the same applies to the through-connectable connection paths individual to a connection via the line unit DIU2, the subswitching network GSY, and the link changeover device LUY to the central switching network SN. In standby switching operation, including emergency operation, all connections which extend via the line units of the two line groups pairwise assigned to each other, extend via only one of its two subswitching networks. When changing over from normal operation to standby switching operation, the cited connection paths are changed over via the cited line units of a line unit from the subswitching network assigned to them to the particular partner subswitching network by way of which subsequently all connection paths run for the duration of the standby switching operation. For changing over, different possibilities exist. Provision can be made for a changeover only for the connection path segments between the line units DIU and the subswitching networks GS. Likewise, provision can also be made for a changeover only for the connection path segments between the subswitching networks GS and the link changeover devices. In the first case these can even be omitted. There is also the possibility of providing changeovers in both places.

Provision is made for controlling the subswitching network of two line groups pairwise assigned to each other already during normal operation such that all connections are always through-connected in each of the two. This means, for example, that in the upper line group represented in the drawing, not only those connections which extend via the line units DIU1 and the link changeover device LUX are through-connected via the subswitching network GSX, but also additional connections in preparation for a change to standby switching operation and specifically for connections which extend via the line units DIU2 and via the link changeover device LUY. These connections are also referred to for clarity as "standby switching operation connections". To this end the line groups assigned pairwise to each other, in particular their intermediate-level control units, are connected with each other in a manner, not further shown here, for the purpose of reciprocal transfer of setting information for these standby switching operation connections.

As has been explained, a link connection exists from switching network SN to the subswitching network of each line group. Lastly, the subswitching network is connected via the previously mentioned link changeover switching configuration to the particular link connection. Within a line group, the particular subscriber lines and/or interexchange trunk line are connectable with the link connections in a manner known per se, where the lines, instead of being lines in the conventional sense (galvanic connections), can also be appropriate channels or channel pairs. Via the line units DIU1 or DIU2, the particular subscriber lines and/or interexchange trunks, not shown specifically, are connected with the equalizing memories H1 to H9. Such equalizing memories function in a manner known per se for time compensation. Such equalizing memories are disclosed and explained, for example, in German patent application 31 04 002 (VPA 81 P 6203). They function in known manner in time division multiplex technology for the time adaptation of the transmitted pulse frames in the event that delays occur in the transmission of the message streams flowing in the pulse frames transition time-depending. It is then required to reestablish synchronism with respect to clock and pulse frame, i.e. synchronism in both respects. This is accomplished in known manner with the aid of the variously known equalizing memories.

In the present case such equalizing memories are also provided. They are clock-controlled and function to receive and transfer with time delay the messages transmitted via the individually established connections. They are controlled in a manner known per se in such a way that between acquisition and routing of the signals, approximately the smallest possible delay times are utilized. As is apparent from the drawing, the cited subscriber lines and/or interexchange lines via the particular line units DIU are equipped in duplicate with such equalizing memories in that for each subswitching network in a line group, the first of these equalizing memories H1 and H3 are connected with the subswitching network GSX within one and the same line group; however, the second equalizing memories H2 and H4 are connected with the particular partner subswitching network GSY in the appropriate partner line group. The equalizing memories accept the messages individual to a connection supplied to them in the form of pulse frames. The pulse frames follow one another in succession. The sequential pulse frames each comprise a multiplicity of individual connections. In a manner known per se for each connection, information bits are transmitted interlaced into each other, and these information bits are combined into pulse frames.

These pulse frames follow one another successively. The information contained in them belong to a multiplicity of channels or to connections switched-through via them. The equalizing memories take up the information contained in the pulse frames and store them. These processes are referred to as "write processes". The pulse frames are subsequently read out again with suitable time shift and transmitted in a manner known per se such that each required time adaptation is accomplished. The acquisition and write processes, on the one hand, and the read and routing processes, independently of each other with an appropriate time shift, thus take place in these equalizing stages. The time adaptation thereby achievable applies to the time position of the pulse slopes of the individual clock pulses and/or the time positions o the pulse frame identification bits previously referred to which mark in each instance the beginning of each pulse frame. The equalizing memories are desirably operated in a manner known per se such that the smallest possible delay times between the write and the read processes applies.

As explained, the equalizing memories H1 to H4 or H6 to H9 are provided for those connection paths between line unit DIU and subswitching network GS... which extend within their own line group as well as well as for those connection paths which extend with a pair of line groups of the line units, for example DIU1, of the one line group to the subswitching network, for example GLY, of the other line group.

Of particular importance is the control of the acquisition and write processes as well as of the read and routing processes of the equalizing memories. These processes are clock-controlled in a manner known per se.

First, the acquisition and write processes are explained. In the message flow in a first transmission direction, for example from subswitching network GSX to the subscriber lines and/or interexchange trunk lines connected to the line units DIU1, are situated the equalizing memory(s) H1. The equalizing memory(s) H2 is or are situated in the message flow from subswitching network GSY of the partner line group to the cited subscriber lines and interexchange trunk lines which are connected via the line units DIU1. The equalizing memories have a connection shown in the drawing in each instance above them and a connection shown below them. The connection shown above may be assumed to be the feed line of the pulse clock for the acquisition and write processes. The connection shown in the drawing below each of the equalizing memories may be assumed to be the feed line for the pulse clock for the read and transfer processes.

As is apparent from the drawing, the acquisition and write processes of the two equalizing memories H1 and H2, which are in the message flow in the cited first transmission direction from the particular subswitching network to the line units functioning for the connection of the subscriber lines and/or interexchange trunks, are controlled by a pulse clock governing the particular subswitching network. The upper connection of the equalizing memory H1 is connected hereto via the clock line thx to the clock-pulse transmitter TX of the subswitching network GSX. The upper connection of the equalizing memory H2 is connected via the clock pulse line to the clock pulse transmitter TY of the subswitching network GSY. Each equalizing memory is thus controlled by a pulse clock governing that subswitching network with which it is in each instance connected. To this end, each of these equalizing memories is connected, in each instance, with a clock pulse transmitter assigned to the particular subswitching network.

In the reverse message flow, that is, from the subscriber lines and interexchange trunk lines via the particular line units, for example DIU1, to the one or other subswitching network are the equalizing memories H3 and H4 or H8 and H9 respectively. These equalizing memories are controlled with respect to acquisition and write processes in each instance by a pulse clock which is governing for the particular line unit, for example DIU1. The equalizing memories H3 and H4 which belong to the upper line group thus receive a pulse clock which governs line unit DIU1. Hence, it is ensured that the equalizing memories H3 and H4 which are in the cited second transmission direction are controlled with respect to acquisition and write processes in each instance by that pulse clock which is governing for the line unit of the subscriber lines and interexchange lines connected to the same subswitching network. The "same subswitching network" in this case is that to which the particular subscriber and interexchange trunk lines are connected in normal operation. Hence, that subswitching network and those subscriber lines and interexchange trunk lines are involved which belong to in each instance same line group.

The read and routing processes for the equalizing memories H1 to H9 will be next described. With respect to the message flow in the first transmission direction (from the subswitching network to the line units to which the subscriber lines and interexchange trunk lines are connected) via the particular lower equalizing memory connection which—as already indicated—function to supply the pulse clock for the read and routing processes, the particular equalizing memories H1 and H2 or H6 and H7 respectively are controlled in each instance by that pulse clock which is also governing for the completion of functions in line units DIU1 or DIU2. Equalizing memories H1 and H2 are to this end controlled by a clock pulse transmitter THX which is assigned to the line units DIU2. Correspondingly, the same applies for the equalizing memories H6 and H7 which are stored by a clock pulse transmitter THY which is assigned to the line units DIU2.

With respect to the message flow in the second, i.e. the reverse transmission direction, the particular equalizing memories, for example H3 and H4 to which the line group belongs which in the drawing is represented in the upper part, are controlled differently in the particular read and routing processes. Correspondingly, the same is true analogously for equalizing memories H8 and H9 in the line group shown in the lower part of the drawing. Equalizing memory H3, for example, which in the upper line group supplies its information within the line group, i.e. to its own subswitching network, receives from it the pulse clock for the read and routing processes. To this end it is connected via the pulse clock line thx to the clock pulse transmitter TX of its own subswitching network, i.e. that subswitching network which, with the line units DIU1 to which the equalizing memory(s) H3 are connected at the input side, belongs to the same line group. Correspondingly, the same applies analogously for the equalizing memory(s) H9 in the lower line group represented in the drawing. Equalizing memories H3 and H9 which output their information in each instance to the line group-same subswitching network are also referred to as "first" equalizing memories. The "second" equalizing memories H4 and H8 supply their information in standby switching operation in each instance to the subswitching network of the partner line group. They also receive from here their pulse clock governing the read and routing processes. Thus, the second equalizing memory H4, for example, which supplies its information during standby operation to the subswitching network GSY, receives its pulse clock for the read and routing processes from pulse clock transmitter TY belonging to one of these subswitching networks. Thus, that pulse clock which is governing for the completion of functions in the subswitching network GSY is simultaneously also governing for the read and routing processes in the second equalizing memory H4. The same applies analogously for the second equalizing memory H8 in the other line group.

During normal operation contacts 3ux and 3uy are in the idle position as shown in the drawing. Upon changing from normal operation to standby switching operation in a line group the particular changeover contact, for example 3ux, is switched over from its shown idle position into its operating position. Thereby, the connections which did exist until then via the equalizing memory H1 and via the corresponding subswitching network GSX, now run via the equalizing memory H2 and the particular subswitching network GSY of the partner line group. The message stream in the other transmission direction via the equalizing memory H3 does not need to be changed over as will be explained below in greater detail. What is essential in the explained context is that the equalizing memories H3, on the one hand, and H4, on the other hand, run clock-synchronously with the subswitching networks GSX, on the one hand, and GSY on the other hand. If changeover of the connections takes place, then the requisite synchronism already exists. The same applies analogously for the synchronism with respect to read and routing processes of the equalizing memory H8 or H9 with the subswitching networks GSX or GSY. The read and routing processes, for example of the equalizing memory H3 thus run clock-synchronously with the subswitching network GSX. Likewise, the read and routing processes of the equalizing memory H4 with the subswitching network GSY run clock-synchronously. If now a switch-over from normal operation to standby operation takes place, phase jumps with respect to pulse slopes of the clock pulses as well as with respect to the pulse frame identification bits and all similar disturbances are prevented through these measures.

As has already been explained, one link changeover device, for example LUX, is provided for each subswitching network, for example GSX and link connection. With the aid of this link changeover device the particular link connection between it and the switching network SN can be changed over to the particular partner subswitching network, for example, GSY. The subswitching networks are also equipped in duplicate for the connection of the link connection to the similarly clock-controlled equalizing memories E1 to E9, functioning for the reception and time-delayed further routing of the messages transmitted via the individually established connections. For each subswitching network, for example GSX, the first of these equalizing memories, for example E1 and E2, are connected in normal operation to the link connections assigned in the particular subswitching network, for example GSX, via the link changeover device LUX. During normal operation the changeover switch 2ux is in the idle position shown in the drawing. Second equalizing memories, for example E3 and E4, can be connected in standby switching operation to the link connection assigned to the particular partner subswitching network, for example GSY (via LUY) that is, that link connection which, for example, extends between the link changeover device LUY and the subswitching network SN. The same applies analogously in reverse for the other line group and its possibilities of changeover switching.

It is now provided that the acquisition and write processes of the different equalizing memories are controlled in a useful manner. The acquisition and write processes of those equalizing memories which are in the message flow in the transmission direction from subswitching network to the link connections, are controlled by a pulse clock governing the particular subswitching network. Thus, the acquisition and write processes of the equalizing memories E2 and E3, for example, are controlled by the clock pulse transmitter TX, whose pulse clock is governing for the subswitching network GSX. The acquisition and write processes of those equalizing memories, for example E1 and E4 which lie in the message flow of the reverse transmission direction (thus from the link connection to the subswitching network) are controlled separately by two different pulse clocks. The first equalizing memory E1 is controlled by a pulse clock governing the link changeover device LUX of the particular subswitching network GSX via the pulse clock line t1, and specifically by the clock pulse transmitter TLX of the link changeover device LUX. The second equalizing memory E4, in contrast, is controlled by a pulse clock governing the link changeover device of the particular partner subswitching network GSY and, specifically, via the clock pulse line ty from clock pulse transmitter TLY.

The acquisition and write processes of the equalizing memory G1 are thus clock-synchronous with the link changeover device LUX. The acquisition and write processes of the equalizing memory E4 are clock-synchronous with the link changeover device LUY of the partner line group. The same applies analogously for the other line group.

The read and routing processes of the first and second equalizing memory E1 and E4 which are in the message flow in the transmission direction from the central switching network SN to the subswitching networks are controlled by the pulse clock governing the particular subswitching network. Thus, the read and routing processes of the first equalizing memory E2 and the second equalizing memory E4 are controlled by the same pulse clock which is also governing the completion of functions in the subswitching network GSX. These equalizing memories receive their pulse clock for their read and routing processes from clock pulse transmitter TX.

The equalizing memories which lie in the other transmission direction, specifically in the direction of transmission from the subswitching networks to the central switching network SN, are controlled differently. This affects the equalizing memories E2 and E3. The first equalizing memory E2, which outputs its information to the line group-same link changeover device LUX, is controlled by that pulse clock which is governing for the link changeover device LUX, that is that link changeover device which corresponds to the particular subswitching network GSX (what is intended is thus the line group appurtenant to same subswitching network). The equalizing memory E2 is thus controlled by clock pulse transmitter TLX with respect to read and routing processes. The second equalizing memory E3 is, in contrast, controlled by a pulse clock governing the link changeover device LUY corresponding to that of the partner subswitching network. The equalizing memory E3 is controlled with respect to its read and routing processes via the pulse clock line ty from the clock pulse transmitter TLY. Thus, the two equalizing memories E2 and E3, which are connected to one and the same subswitching network, are controlled differently with respect to their read and routing processes and, specifically, in each instance by the pulse clock of that link changeover device to which it supplies its output-side information.

Through the measures described, no phase jumps occur during the changeover processes. To this end, the equalizing memories with respect to their acquisition and write processes as well as also with respect to their read and routing processes operate clock-synchronously, phase-synchronously, and synchronously with respect to the pulse frame time markings, and specifically relative to the equalizing memories which are connected to a subswitching network and must cooperate with the link changeover devices of two different line groups. If transit-time delays occur whereby the clock pulses and the pulse frame limits may be shifted in time, then with the described changeover processes it is avoided that through phase jumps disturbances in the corresponding connections can occur. Hence, a loss of information upon changeover switching is prevented with respect to the related particular connections.

In PCM technology not only are the voice channels or data connection channels (not to be confused with the data connections between central processor CP and each of the intermediate-level control units GP . . . ), in terms of switching technology switched-through, but also for each connection the signalization channels assigned thereto. These are treated in a manner corresponding to the voice channels.

Clock pulse transmitters which are controlled with the aid of a master clock are known per se. In this regard, reference is made to DE-OS 3 111 022 (VPA 81 P 6224), 32 27 848 (VPA 82 P 1580), and 32 27 849 (VPA 82 P 1581). Clock pulse transmitters TLX, TX, and THX in one line group can each by itself derive the pulse clock from the message stream available in each instance and regenerate it. Preferably, however, it is provided that this is done only by the clock pulse transmitter TLX, whereas the further clock pulse transmitters TX, GCX, and THX receive their master clock from clock pulse transmitter TLX in such a manner that the clock pulse transmitter THX also receives its master clock from clock pulse transmitter TX. Thereto appropriate clock pulse lines (not shown) are provided. Since it may occur that, for example, the subswitching network GSX together with its clock pulse transmitter TX fails due to disturbances, a clock pulse line is provided leading to the clock pulse transmitter THX and providing it with the requisite master clock, so as to be switchable with the aid of a changeover switch, not shown, which then carries out a changeover of the master clock for the clock pulse transmitter THX from TX to TY. The clock pulse transmitter THX subsequently synchronizes itself on what for it is a new clock. Herein, in particular, a synchronization on the pulse frame identification bit takes place in the pulse clock supplied by the clock pulse transmitter TY to the clock pulse transmitter THX.

A peculiarity in the operating manner of changeover switches 2ux and 1uy as well as 3ux and 3uy should be discussed. The changeover switch 2ux in the link changeover device LUX is controlled by means of a changeover command which is outputted by the link closure circuit GLX (referred in the supplement cited above as "LIU") which is outputted to it on the subswitching network GSX of the same line group. This changeover command may comprise a pulse continuously supplied via a pulse line not shown in detail by the link terminal circuit or by the subswitching network during normal operation being absent. But the changeover switch 2ux is not controlled by it alone but additionally by the pulse clock derived by means of a pulse clock scanning device R1 from the message stream or by the pulse clock regenerated by means of the pulse clock transmitter TLX receiving the latter, and specifically in such a manner that the changeover switch 2ux is changed over when after arrival of the changeover command the current clock pulse is completed. Thereby it is ensured that the changeover itself also takes place clock-synchronously and a corresponding potential information loss due to signal mutilation is avoided. The same applies analogously for 3ux and 3uy. The changeover switch 3ux at the line unit DIU1 is controlled by means of a changeover command which is supplied to it by this line unit. This changeover command may also comprise a pulse continuously supplied during normal operation via a pulse line not shown in detail being absent. But the changeover switch 3ux is not controlled by it alone but additionally by the pulse clock governing the line unit DIU1 and regenerated by means of the pulse clock transmitter THX, and, specifically, in such manner, that the changeover switch 3ux is changed over when, after arrival of the changeover command, the current clock pulse is completed. This ensures also in this case that the changeover also takes place clock-synchronously and a potential information loss due to signal mutilation is avoided. In this connection according to the drawing it should be stated that the first equalizing memories H1 and H3 are provided for normal operation (thus before changing over to standby switching operation) and the second equalizing memories H2 and H4 for standby switching operation (following this changeover) and that for this changeover, changeover switches 3ux or 3uy are assigned to the subscriber lines and/or interexchange trunk lines. These changeover switches are controlled in a manner similar to the operating manner of changeover switches 2ux and 1ux depending on, firstly, a changeover command which is supplied thereto by the particular subswitching network or the assigned subcontrol unit, and, secondly, by a clock signal which is derived from the pulse clock governing the particular line unit (DIU1) as well as from the pulse clock in R1 governing the link connection from LUX to SN assigned to the particular subswitching network GSX and which ensures that the changeover takes place between two clock pulses.

We claim:

1. A circuit configuration for clock-controlled time division multiplex telecommunication switching installations, including PCM telephone switching installations, with hierarchical structure with a central switching network, a central processor, with subswitching networks coupled thereto via link connections, functioning to connect subscriber lines and/or interexchange trunk lines or channels and with intermediate-level control units assigned thereto, and with a clock supply system wherein from a central clock pulse generator, assigned to the processor and governing the clock-controlled completion of functions, clock pulse transmitters, individually assigned to the control units, functioning for the regeneration of a clock pulse, and governing the clock pulse-controlled completion of functions in each of the control units, receive their master clock int hat they derive the latter respectively from the message stream transmitted in a pulse clock-controlled manner of the connections extending via the switching network and via the subswitching networks and regenerate said latter, and with a pairwise mutual assignment of the subswitching networks, where in normal operation separately via connection paths respectively leading via the one and the other of the two, can be switched over upon changing to standby switching operation from one of the two subswitching networks to the other subswitching network by way of which all connection paths then lead, characterized in that subscriber lines and/or interexchange trunk lines or channels assigned in each instance to a subswitching network and connectable thereto to link connections connected thereto, are equipped with first and second clock-controlled duplicate equalizing memories functioning for the acquisition and time-delayed routing of messages transmitted via individually established connections, in that for each subswitching network the first of said equalizing memories are connected with the network itself and the second equalizing memories with the particular partner subswitching network, that the acquisition and write processes of the different equalizing memories which are in the message flow in a first direction of transmission from the particular subswitching network to the subscriber lines and/or interexchange trunk liens or channels, are controlled by a pulse clock governing the particular subswitching network, in particular by a clock pulse transmitter assigned thereto, and are in the message flow in a second direction of transmission, the reverse of said first direction, are controlled by a pulse clock which governs a line connection device of the subscriber lines and/or interexchange trunk lines or channels connected to the same subswitching networks, in particular from a clock pulse transmitter assigned to said line connection device, and that read and routing processes of the first and second equalizing memories with respect to the message flow in the second, and thus reverse, direction of transmission are controlled differently, and specifically in such a manner that hereby the particular first equalizing memory is thereby controlled by a pulse clock governing the particular own subswitching network, in particular by a clock pulse transmitter assigned thereto, and the particular second equalizing memory by a pulse clock governing the partner subswitching network, in particular by a clock pulse transmitter assigned thereto.

2. A circuit configuration as recited in claim 1, characterized in that the first equalizing memories are provided for normal operation before changeover switching to standby operation and the second equalizing memories for standby operation after this changeover switching, and that, for this changeover switching, changeover switches are assigned to the subscriber lines and/or interexchange trunk lines.

3. A circuit configuration as recited in claim 1, characterized in that the changeover switches are controlled firstly depending on a changeover command which is given to them by the particular subswitching network, and, secondly, by a clock signal which is derived from the pulse clock governing a particular line connection device and which ensures that the changeover switching takes place between two clock pulses.

4. A circuit configuration for clock-controlled time division multiplex telecommunications switching installations, in particular PCM telephone switching installations, with hierarchical structure with central switching network, central processor, with subswitching networks connected thereto via link connections, functioning to connect subscriber lines and/or interexchange trunks or -channels and with intermediate-level control units assigned thereto, and with a clock supply system wherein which from a central clock pulse generator, assigned to the processor and governing its clock-controlled completion of functions clock pulse transmitters, individually assigned to the control units, functioning for the amplification regeneration of clock pulses and governing the clock pulse-controlled completion of functions, receive their master clock in that they derive the latter respectively from the message stream transmitted in pulse clock-controlled manner of the connections switched-through via the switching network and via the subswitching network and regenerate said latter, and with a mutual pairwise assignment of the subswitching networks, where in normal operation in connection paths respectively leading separately via the one and the other of the two, upon changing to standby operation can be switched over from one of the two subswitching networks to the other subswitching network by way of which subsequently all connection paths lead, characterized in that, by means of a changeover device provided for each subswitching network and link connection, said subswitching network and link connection can be changed over from the assigned subswitching network to the particular partner subswitching network, that the subswitching networks for connecting the link connections are equipped in duplicate with first and second clock-controlled equalizing memories functioning for the acquisition and time-delayed routing of messages transmitted via individually established connections, in that for each subswitching memory, the first of said equalizing memories in normal operation are connected with the link connection assigned to the same subswitching network via its changeover device, and the second equalizing memories in standby operation are connectable with the link connection assigned to the particular partner subswitching network, that the write processes of the different equalizing memories which lie in the message flow in a first direction of transmission from the particular subswitching network to the link connections are controlled by a pulse clock governing the same, in particular by a clock pulse generator assigned to said subswitching network and are in the message flow of a second direction of transmission, the reverse of said first direction of transmission, are controlled separately by two different pulse clocks, in that a first equalizing memory is controlled by a pulse clock governing the changeover device of the particular subswitching network, in particular by a clock pulse transmitter assigned thereto and a second equalizing memory by a pulse clock governing the changeover device of the particular partner subswitching network, in particular by a clock pulse transmitter assigned thereto, and that the read and routing processes of the first and second equalizing memories in a subswitching network are controlled differently with respect to the message flow in the second direction of transmission by a pulse clock governing the particular subswitching network, in particular by a clock pulse transmitter assigned thereto and with respect to the message flow in the first direction of transmission, and specifically such that herein the particular first equalizing memory is controlled by a pulse clock governing the changeover device corresponding to the particular subswitching network, in particular by a clock pulse transmitter assigned to it, and the particular second equalizing memory by a pulse clock governing the changeover device corresponding to the partner subswitching network, in particular by a clock pulse transmitter assigned thereto.

5. A circuit configuration as recited in claim 4, characterized in that the changeover devices are controlled depending, firstly, on a changeover command which is given thereto by the particular subswitching network, and, secondly, by a clock signal which is derived from the pulse clock governing the link connections assigned to the particular subswitching network, and which ensures that the changeover takes place between two clock pulses.

* * * * *